United States Patent
Li et al.

(10) Patent No.: US 10,831,658 B2
(45) Date of Patent: Nov. 10, 2020

(54) READ-WITH-INVALIDATE MODIFIED DATA IN A CACHE LINE IN A CACHE MEMORY

(71) Applicant: INTEL CORPORATION, Santa Clara, CA (US)

(72) Inventors: Yanru Li, San Diego, CA (US); Chia-Hung Kuo, Folsom, CA (US); Ali Taha, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 9 days.

(21) Appl. No.: 16/239,455

(22) Filed: Jan. 3, 2019

(65) Prior Publication Data
US 2019/0138448 A1   May 9, 2019

(51) Int. Cl.
| G06F 12/08 | (2016.01) |
| G06F 12/0808 | (2016.01) |
| G06F 12/0853 | (2016.01) |
| G06F 12/126 | (2016.01) |
| G06F 12/0811 | (2016.01) |
| G06F 12/0868 | (2016.01) |

(52) U.S. Cl.
CPC ...... *G06F 12/0808* (2013.01); *G06F 12/0811* (2013.01); *G06F 12/0853* (2013.01); *G06F 12/0868* (2013.01); *G06F 12/126* (2013.01); G06F 2212/1016 (2013.01); G06F 2212/1028 (2013.01)

(58) Field of Classification Search
None
See application file for complete search history.

(56) References Cited

U.S. PATENT DOCUMENTS

| | | | | |
|---|---|---|---|---|
| 5,522,058 A | * | 5/1996 | Iwasa | G06F 12/0813 711/121 |
| 6,065,077 A | * | 5/2000 | Fu | G06F 12/0813 709/233 |
| 6,148,416 A | * | 11/2000 | Masubuchi | G06F 11/1407 714/15 |
| 6,529,968 B1 | * | 3/2003 | Anderson | G06F 13/1668 710/22 |
| 6,996,681 B1 | * | 2/2006 | Autechaud | G06F 12/0813 709/252 |
| 8,612,676 B2 | | 12/2013 | Dahlen et al. | |
| 9,378,142 B2 | | 6/2016 | Ramanujan et al. | |
| 2003/0191905 A1 | * | 10/2003 | Chen | G06F 12/0817 711/147 |
| 2004/0133746 A1 | * | 7/2004 | Edirisooriya | G06F 12/126 711/133 |
| 2008/0189487 A1 | * | 8/2008 | Craske | G06F 12/0859 711/125 |
| 2009/0037661 A1 | * | 2/2009 | Fairhurst | G06F 12/0891 711/133 |
| 2010/0293353 A1 | * | 11/2010 | Sonnier | H04L 49/101 711/170 |
| 2017/0177482 A1 | | 6/2017 | Greenspan | |

* cited by examiner

*Primary Examiner* — Kevin Verbrugge
(74) *Attorney, Agent, or Firm* — Konrad Raynes Davda & Victor LLP; David W. Victor (57) ABSTRACT

Provided are an apparatus and method to cache data in a first memory that is stored in a second memory. At least one read-with-invalidate command is received to read and invalidate at least one portion of a cache line having modified data. The cache line having modified data is invalidated in response to receipt of read-with-invalidate commands for less than all of the portions of the cache line.

22 Claims, 6 Drawing Sheets

READ-WITH-INVALIDATE MODIFIED DATA IN A CACHE LINE IN A CACHE MEMORY

TECHNICAL FIELD

Embodiments described herein generally relate to managing modified data in cache memory used to cache data for a larger non-volatile memory.

BACKGROUND

In a two-level memory (2LM) system, a faster access near memory, such as a Direct Random Access Memory (DRAM), is used to cache data for a larger and slower access far memory device, such as a byte addressable, write-in-place non-volatile memory, e.g., the three-dimensional crosspoint memory (3DXP) offered by Intel Corporation. When modified data is evicted from the cache memory to make room for data for a new address, the modified data is copied to the far memory to retain.

There is a need in the art for improved techniques for managing modified data in a cache memory providing a cache for a larger non-volatile memory device.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

In current 2LM systems, the near memory comprises a DRAM and the far memory comprises a larger, slower access device such as a byte addressable, write-in-place non-volatile memory, such as a three-dimensional crosspoint memory (3DXP). The 2LM controller uses a cache replacement policy to select a portion of a cache line in the near memory (e.g., DRAM) for use for data to add to cache. If the selected cache line has modified data, that modified data is flushed or destaged to the far memory (e.g., SSD, 3DXP, etc.). However, not all modified data in the cache memory is needed by the application or process that wrote the data after its use for instant calculations or operations. For instance, a graphical processing unit (GPU) may use cache memory to buffer modified data that is only used for current operations to improve performance, and not de-allocate the buffer even after exiting from current usage. The data in the buffer can be discarded after last access from GPU. Hardware device drivers, such as storage device and bus drivers, may use the cache memory for modified data that may be discarded after transferring data through Input/Output (I/O) operations.

Far memory devices typically have an endurance or life span for a number of write and read operations. Described embodiments seek to maximize the lifespan of the far memory by avoiding flushing modified data in the cache (near) memory to the non-volatile (far) memory that will not be needed for further operations and use by allowing the component using the data, such as a processor, GPU, etc., to communicate that the data is no longer needed or invalid upon a last access of the data. Further, since the data in the cache (near) memory is invalidated instead of being flushed to the non-volatile (far) memory, the far memory access for such temporary buffer is eliminated when the line in near memory cache is replaced, which reduces power consumption.

To allow communication of such an invalidation of data upon last read access, described embodiments provide a read-with-invalidate (RWI) command to read and invalidate at least one portion of a plurality of portions of a cache line having modified data. When the cache line having modified data is selected for replacement, the modified data is not copied to the non-volatile (far) memory if portions (some or all) of the cache line being flushed have been invalidated with the (RWI) command.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
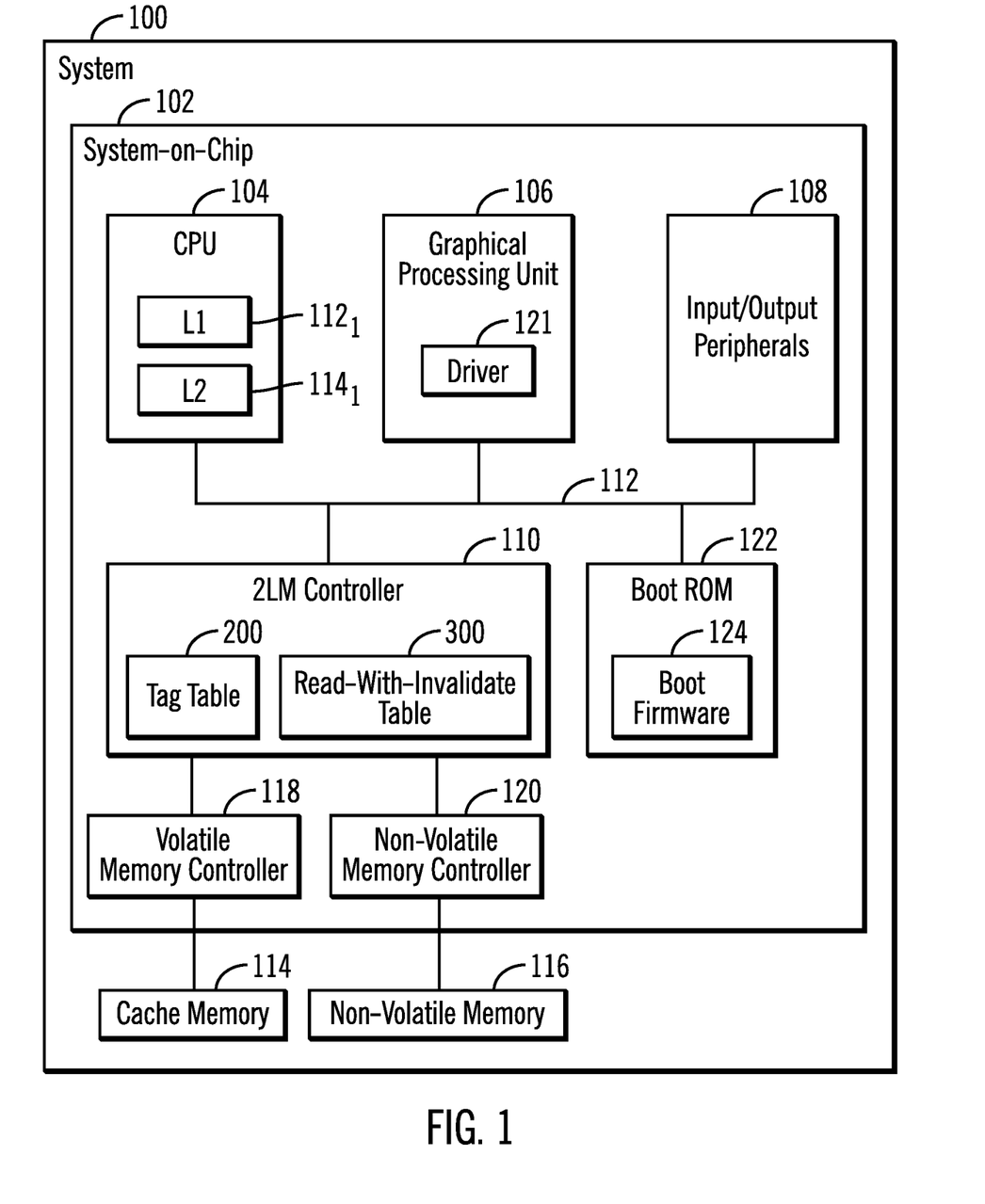
FIG. 1 illustrates an embodiment of a system in which embodiments are implemented.

FIG. 1 illustrates an embodiment of a system 100 including a system-on-a-chip ("SoC") 102 having a central processing unit (CPU) 104, a graphical processing unit (GPU) 106, and Input/Output (I/O) peripherals 108 that generate read and write requests to a two-level memory controller ("2LM controller") 110 over an interface 112, including, by way of example, without limitation, a memory bus, Peripheral Component Interconnect (PCI) bus, such as the Peripheral Component Interconnect express (PCIe) bus, etc.

The 2LM controller 110, also on the SoC 102, stores cache lines for addresses in a cache memory 114, also referred to as a near memory or first memory. Modified data in cache lines evicted from the cache memory 114 to make room for new data are copied to a non-volatile memory 116, also referred to as a far memory or second memory, which has a larger capacity than the cache memory 114. The CPU 104 may include an on-chip L1 cache 112 and on-chip L2 cache 114 that are private to the CPU 104.

The 2LM controller 110 includes a tag table 200 having information on addresses of data stored in cache lines in the cache memory 114, e.g., address, valid bit, dirty bit, etc., and a read-with-invalidate (RWI) table 300 having entries for some or all of the cache lines in the cache memory 114 that indicates whether portions of data in a cache line have valid data. The components 104, 106, and 108 may store local data in the cache memory 114 to modify and read that is only used in calculations and operations and not intended to be used by other components beyond short term local usage for data calculations. Such locally used data can be discarded after the component 104, 106, 108 completes usage. Upon reading such local data for a last time, the component 104, 106, 108 hardware may issue a read-with-invalidate (RWI) command to the cache line or a portion of the cache line having the data being read for the last time to cause that portion of the data in the cache line to be invalidated after being read. A size of the portion of the cache line depends on the size of the transaction from the hardware component and the cache line size in the cache memory 114. This invalidation of the portion of the data prevents the data in the cache line from being copied to the non-volatile memory 116. In this way, the 2LM controller 110 frees a cache line in the cache memory 114 to make room for new data without having to flush the modified cache line to the non-volatile (far) memory 116.

For instance, the GPU 106 includes a driver 121 program that stores local data in the cache memory 114 to improve performance, and may issue an RWI command to invalidate a portion of the data in a cache line upon last access of the data that is no longer needed for the GPU 106 operations. The components 104 and 108 may also include drivers 121 that store localized data used only for certain local operations in the cache memory 114.

The 2LM controller 110 interfaces with the cache memory 114 via a volatile memory controller 118 and interfaces with the non-volatile memory 116 via a non-volatile memory controller 120. The cache memory 114 and non-volatile memory 116 may comprise a main memory of the components 104, 106, 108, where the cache memory 114 operates as a cache for the non-volatile memory 116, having cache lines to cache data and addresses from the non-volatile memory 116.

In one embodiment, the cache memory 114 may be comprised of one or more volatile memory devices requiring power to maintain the state of data stored by the medium. Non-limiting examples of volatile memory may include various types of random access memory (RAM), such as Dynamic Random Access Memory (DRAM), Dual Direct In-Line Memory Modules (DIMMs), synchronous dynamic random access memory (SDRAM), etc. In particular embodiments, DRAM of a memory component may comply with a standard promulgated by JEDEC, such as JESD79F for Double Data Rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

The non-volatile memory 116 may be comprised of a byte-addressable write in place non-volatile memory device, such as a ferroelectric random-access memory (FeTRAM), nanowire-based non-volatile memory, three-dimensional crosspoint memory (3DXP), phase change memory (PCM), memory that incorporates memristor technology, Magnetoresistive random-access memory (MRAM), Spin Transfer Torque (STT)-MRAM, SRAM, storage devices, etc. In certain embodiments, the 3D crosspoint memory may comprise a transistor-less stackable cross point architecture in which memory cells sit at the intersection of word lines and bit lines and are individually addressable and in which bit storage is based on a change in bulk resistance. In a further embodiment, the non-volatile memory 116 may comprise a block addressable non-volatile memory, such as NAND dies (e.g., single level cell (SLC), multi-level cell (MLC), triple level cell (TLC) NAND memories, etc.).

The 2LM controller 110 determines whether data requested by an application communicating read requests to the processor 102 using an address in the non-volatile memory 116 is in the cache memory 114. If not in the cache memory 114, the 2LM controller 110 fetches the requested data from the non-volatile memory 116 and stores in the cache memory 114 to be available for faster cache access for future accesses.

In alternative embodiments, the controller 110 may comprise a controller other than a 2LM controller to manage data in a cache memory and other storage devices. Other types of technologies and protocols may be used to implement the controller 110 to maintain a first level memory 114 as a cache for a larger second level memory 116 and possible further level memories. The functions of the controllers 110, 118, and 120 may be implemented in one or more devices.

The SoC 102 further includes a boot Read Only Memory (ROM) 122 having boot firmware 124 to perform system initialization of all the components on the SoC 102, such as Unified Extensible Firmware Interface (UEFI) or Basic Input Output System (BIOS) firmware. This boot firmware 124 initializes all the components on the SoC 102 during a power-on or initialization sequences to provide boot services for system initialization and runtime services after control is handed over to the operating system for runtime operations.

The system 100 may also communicate with Input/Output (I/O) devices, which may comprise input devices (e.g., keyboard, touchscreen, mouse, etc.), display devices, graphics cards, ports, network interfaces, etc.

The system-on-a-chip (SoC) 102 may comprise an Intel® Core® microarchitecture or multi-core processor microarchitecture from other vendors and manufacturers. (Intel and Core are trademarks of Intel Corporation throughout the world). In alternative embodiments, the different components 104, 106, 108, 110, 118, 120, 122 on the SoC 102 may be implemented on separate integrated circuit devices on a motherboard.

Figure 2:
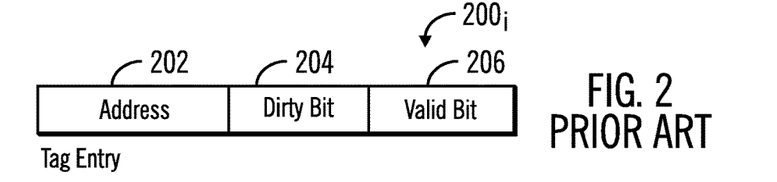
FIG. 2 illustrates an embodiment of a tag entry for a cache line in tag table as known in the prior art.

FIG. 2 illustrates an embodiment of a tag entry $200_i$, as known in the prior art, in the tag table 200 having an entry for each cache line in the cache memory 114, and includes part of the address 202 for the data; a dirty bit 204 indicating whether the cache line corresponding to the tag entry $200_i$ has modified data; and a valid bit 206 indicating whether the cache line has valid data. The dirty bit 204 and valid bit 206 may also be referred to as dirty flag and valid flag, respectively.

Figure 3:
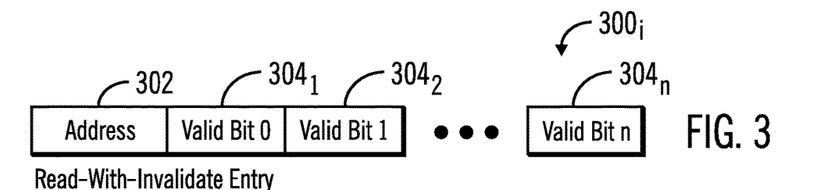
FIG. 3 illustrates an embodiment of a read-with-invalidate (RWI) entry in an RWI table.

FIG. 3 illustrates an embodiment of a read-with-invalidate entry $300_i$ in the read-with-invalidate table 300 indicating whether portions of data for an address in a cache in the cache memory 114 have valid data. The entry $300_i$ includes an address 302, which matches an address 202 in the tag table 200 for a cache line in the cache memory 114 and a plurality of portion indicators $304_1, 304_2 \ldots 304_n$, each indicating whether a portion of data in a cache line in the cache memory 114 is valid. The portion indicators $304_1$, $304_2 \ldots 304_n$ are initialized to indicate valid when data for a tag 202 is added to a cache line. A portion indicator $304_i$ for a portion i in a cache line is set to invalid in response to receiving a read-with-invalidate command from a component 104, 106, 108 specifying a portion i of a target address, where the data size per transaction may comprise the size of the portion.

Figure 4:
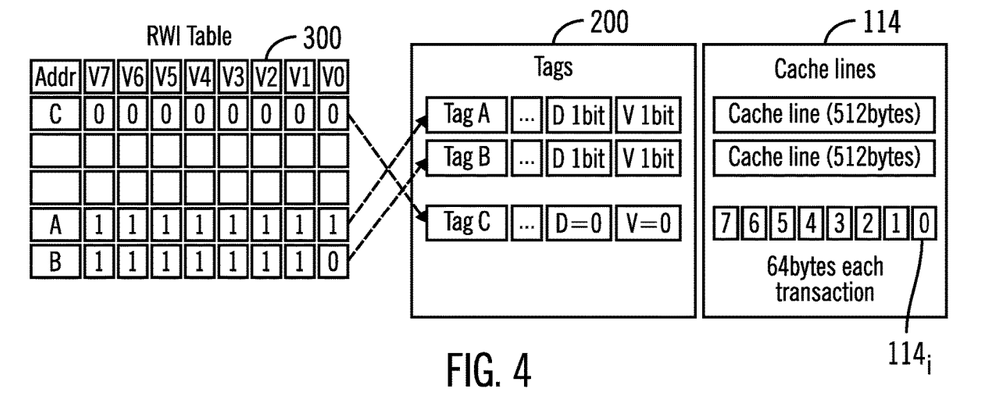
FIG. 4 illustrates an example of how the RWI table relates to entries in a tag table and cache lines in a cache memory.

FIG. 4 illustrates how entries in the read-with-invalidate (RWI) table 300 map to entries in the tag table 200 that correspond to cache lines in the cache memory 114. Cache line $114_i$ shows the cache line comprised of eight portions and the RWI table 300 has portion indicators shown as (V0, V1 . . . V7) corresponding to the portions of the cache lines, e.g., $114_i$, numbered 1 through 7. The RWI table 300 may include an entry for all the addresses in the tag table 200 or less than all the addresses and cache lines storing data for the addresses 202.

Upon read access with RWI asserted, if the data is not present in the near memory cache 114, then the 2LM controller 110 fetches the data from the non-volatile memory 116, but does not store the data in the near memory cache 114. If the data exists in the cache memory 114 and there is no entry in the RWI table 300, then a new entry $300_i$ is added to the RWI table 300 to track the validity of the portions and the portion corresponding to the current transaction is marked as invalid. If the data exists in the cache memory 114 and an entry $300_i$ is in the RWI table 300, then an eviction might be avoided if the 2LM controller 110 does not replace this line to make the cache line less likely to be replaced. If this cache line is chosen to be replaced, then the entry $300_i$ in RWI may be removed and the whole cache line in the near memory will be flushed to the non-volatile memory 116.

Figure 5:
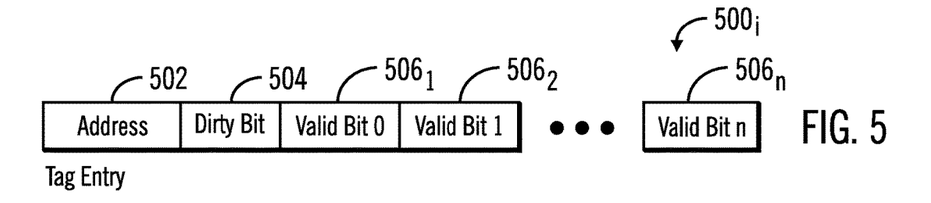
FIG. 5 illustrates an alternative embodiment of a tag entry having portion indicators.

FIG. 5 illustrates an alternative embodiment of the implementation of the position indicators in a tag entry $500_i$ in the tag table 200, where there is no RWI table 300, and the position indicators are implemented in the address entry 500i of the tag table 200. This alternative embodiment of the tag entry $500_i$ includes the address 502, such as tag 200; a dirty bit 504, such as dirty bit 204; and portion indicators $506_1, 506_2 \ldots 506_n$ for each portion of the cache line to indicate whether individual portions are valid or have been invalidated by a RWI command directed to a specific portion.

In one embodiment, the read transactions may have a transactions size, e.g., 64 bytes, and the cache line in the near cache memory 114 to which the transaction is directed may have a size that is an integer multiple of the transaction size, such as 512 bytes. The number of portion indicators may comprise the cache line size multiple of the transaction size. In an alternative embodiment, if the transaction size, e.g., 64 bytes, is the same size as the near memory 114 cache line size, then there may be only one portion indicator that is set invalid by the RWI command. In this embodiment, the portion indicator may just comprise the valid bit 206 in the tag $200_i$.

In an embodiment where the transaction size is smaller than the granularity of a size of the portion is being tracked in the RWI table 300, then the RWI command may not be used for such transactions to invalidate just that portion of the data.

Figure 6:
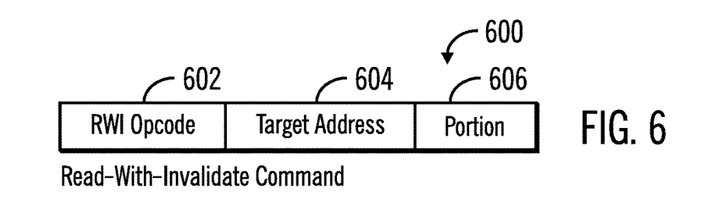
FIG. 6 illustrates an embodiment of a RWI command.

FIG. 6 illustrates an embodiment of a read-with-invalidate (RWI) command 600 triggered by the driver 121 to invalidate data in cache lines stored in the cache memory 114. The RWI command 600 includes an RWI opcode 602 identifying an RWI command to the 2LM controller 110, a target address 604 having data to read and invalidate, and a portion 606 of the target address 604 to read and invalidate. The portion 606 may identify a portion number or a range of bytes in the cache line identifying a portion. In one embodiment, user defined bus signals for a cache operation may use one of the encoding of the signals to identify the cache operation as an RWI command. When the driver 121 sends a read command onto the bus 112, the driver 121 may also assert the RWI signal together with the transaction.

Figure 7:
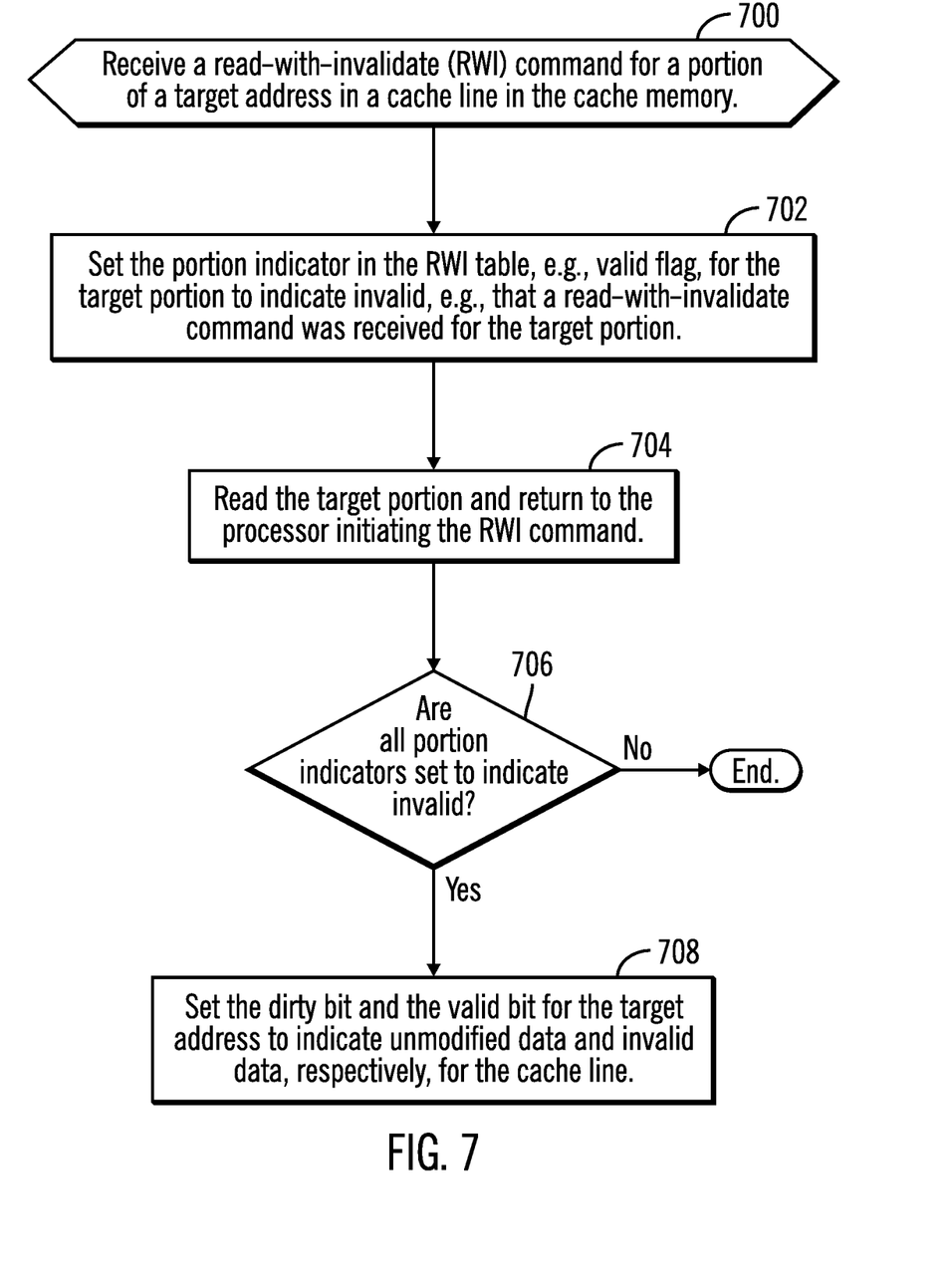
FIG. 7 illustrates an embodiment of operations to process a RWI command to a portion of a target address.

FIG. 7 illustrates an embodiment of operations performed by the 2LM controller 110 to process a read-with-invalidate (RWI) command 600 received from one of the components 104, 106, 108 that is reading locally used and modified data for the last time that is now ready to be discarded without needing to be further saved. Upon receiving (at block 700) the RWI command 600 for a portion i of a target address in a cache line in the cache memory 114, having 1 to n portions, the 2LM controller 110 sets (at block 702) the portion indicator $304_i$ in the entry $300_i$ in the RWI table 300 for the target address 302 having the portion i to indicate invalid, e.g., that a RWI command 600 was received for the portion i for the target address. In one embodiment, upon first RWI access to the data in the cache line, an entry 500i is created in the RWI table 300 for the targeted cache line with all the portion indicators $304_1 \ldots 304_n$ in the RWI entry $300_i$ set to indicate valid except for the portion $304_i$ read by the RWI command 600. The requested target portion i is read (at block 704) and returned to the processor 104, 106, 108 initiating the RWI command 600. If (at block 706) all the portion indicators $304_1 \ldots 304_n$ in the RWI entry $300_i$ for the target 302 address having the portion i just invalidated also indicate invalid data, such as if RWI commands 600 were received with respect to all the portions for the target address or the portions were invalidated for other reasons, then the 2LM controller 110 sets (at block 708) the dirty bit 204 and the valid bit 206 for the target address to indicate unmodified data and invalid data, respectively, for the cache line. If (at block 706) all portion indicators $304_1 \ldots 304_n$ are not invalid, then the cache line is treated as valid because the valid flag then control ends.

In an alternative embodiment, having only a threshold number or any portion indicators $304_1 \ldots 304_n$ indicate invalid may cause the dirty bit 204 and the valid bit 206 for the target address to be set to indicate unmodified and invalid data, respectively.

With the embodiment of FIG. 7, indicating the dirty bit 204 and the valid bit 206 unmodified and invalid, respectively, will result in the 2LM controller 110 not copying the cache line to the non-volatile memory 116, when using the cache line to make room for new data, because there is no valid, modified data to save before overwriting with data for the new target address. The embodiment of FIG. 7 maximizes the lifespan of the non-volatile memory 116, whose lifespan may have an estimated number of read and write operations, by avoiding writes to the non-volatile memory 116 of modified data selected for replacement in the cache memory 114 for new data that will not be needed by future processes. This read-with-invalidate processing minimizes read and write operations to the non-volatile memory 116 to avoid wear and extend the life of the non-volatile memory 116, which is particularly important for non-volatile memory devices, such as SSDs, Phase Change Memories (PCMs), 3DXP, and other non-volatile memories that experience usage wear leveling. Further, this processing also improves system performance and power by eliminating such access to the far non-volatile memory 116.

In a further embodiment, if a determination is made that there is no cache line in the cache memory 114 for a target address of a read-with-invalidate command, then the requested data is accessed from the non-volatile memory 116 to return to the read-with-invalidate command and the accessed data is not stored in an allocated cache line in the cache memory 114 due to the read-with-invalidate instruction indicating that the read is a last access to the data.

Figure 8:
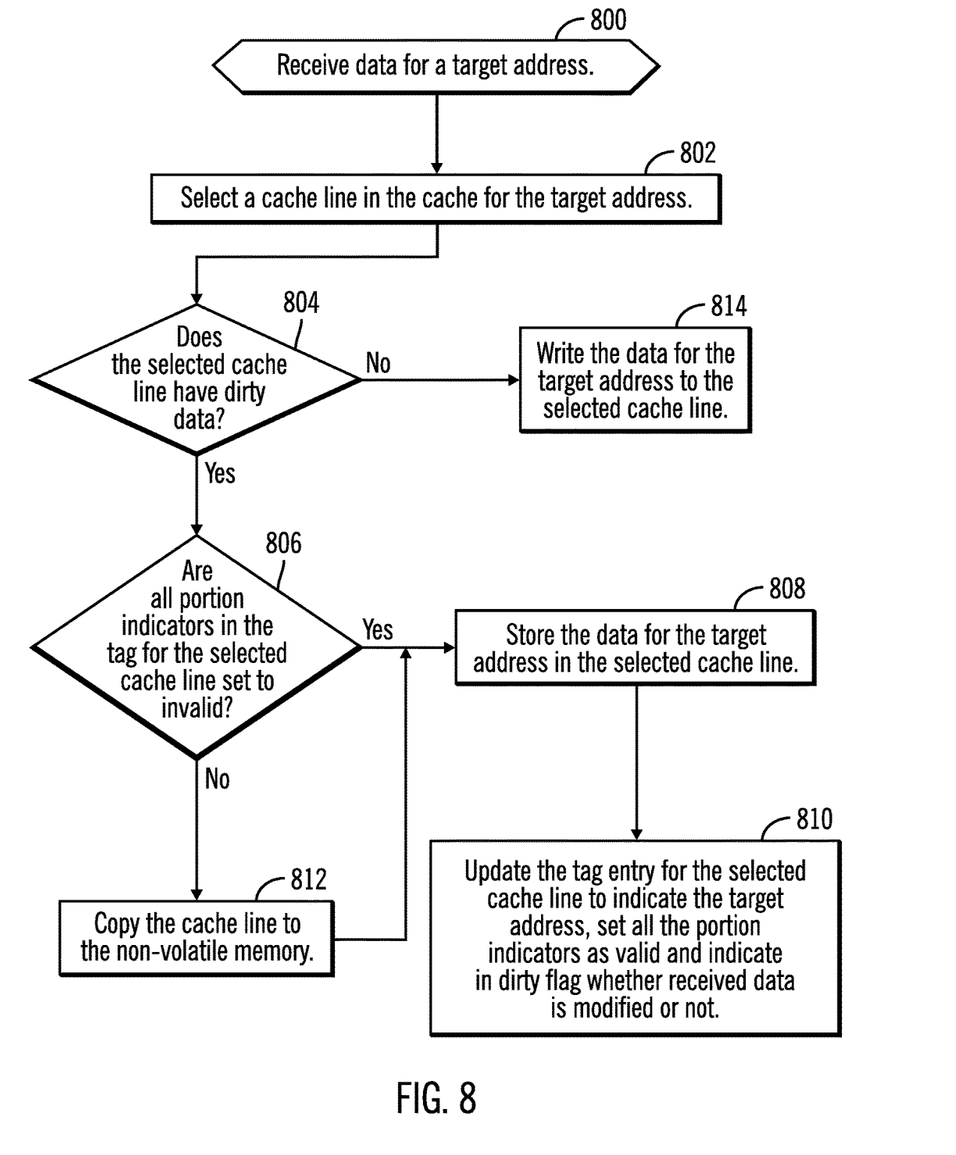
FIG. 8 illustrates an embodiment of operations to select a cache line for data for a target address to add to the cache memory.

FIG. 8 illustrates an embodiment of operations performed by the 2LM controller 110 for the embodiment of FIG. 5 where the portion indicators $506_1$, $506_2$ . . . $506_n$ are embedded in the tag entry $500_i$ in the tag table 200. Upon receiving (at block 800) data for a target address that is not presently stored in a cache line in the cache memory 114, the 2LM controller 110 selects (at block 802) a cache line in the cache memory 114 for the target address. If (at block 804) the selected cache line has dirty data, e.g., the dirty bit 504 is set, then the 2LM controller 110 determines (at block 806) whether all portion indicators $506_1$, $506_2$ . . . $506_n$ in the tag $500_i$ for the selected cache line are set to invalid. If so, then the 2LM controller 110 stores (at block 808) the data for the target address in the selected cache line. The tag entry $500_i$ for the selected cache line is updated (at block 810) to indicate the target address, all the portion indicators $506_i$, $506_2$ . . . $506_n$ are set to indicate valid, and the dirty bit 504 is set to indicate whether received data is modified or not. When all portion indicators $506_1$, $506_2$ . . . $506_n$ indicate invalid (from the yes branch of block 806), then the 2LM controller 110 does not copy data for the current cache line to the non-volatile (far) memory 116 before being overwritten to avoid the write operation to the non-volatile memory 116 when the modified data is no longer needed.

If (at block 806) not all portion indicators $506_1$, $506_2$ . . . $506_n$ in the tag $500_i$ for the selected cache line having modified data are set to invalid, then the cache line, including portions of data marked invalid, is copied (at block 812) to the non-volatile memory 116 and control proceeds to block 808 to store the data for the target address in the selected cache line to the non-volatile memory 116, overwriting data for the previous target address copied to the non-volatile memory 116. If (at block 804) the selected cache line does not have modified/dirty data, then the data for the target address is written (at block 814) to the selected cache line in the cache memory 114. The data for the selected cache line may not be copied to the non-volatile memory 116 before being overwritten with the received data at block 814 because the present data is unmodified.

In an alternative embodiment, having only a threshold number or any portion indicators $506_1$, $506_2$ . . . $506_n$ indicate invalid, may cause the cache line having modified data to be overwritten without copying to the non-volatile memory 116, i.e., treated as if the entire cache line was invalidated. In certain embodiments, a partially invalidated cache line may be allocated to a new data request only after cache lines having modified data with no portions invalidated and having similar replacement characteristics, such as having been in cache for a similar amount of time, are selected for replacement for new data. The cache lines with modified data and having no invalidated portions are copied to the non-volatile memory 116 when evicted. In this way, using a lower eviction priority for partially invalidated cache lines leaves the partially invalidated cache lines in cache longer to provide an opportunity to complete invalidating all portions of the cache line with read-with-invalidate commands to avoid the cache line from having to be copied to the non-volatile memory 116.

In a further alternative embodiment, if less than all the portion indicators $506_1$, $506_2$ . . . $506_n$ indicate invalid, then a new cache line may be selected to replace for the received data for the target address leaving the selected cache line having portion indicators $506_1$, $506_2$ . . . $506_n$ partially invalid in the cache memory 114.

In implementations having the RWI table 300, upon selecting data for a cache line, the entire cache line, of both valid and invalid data, is flushed to the non-volatile memory 116 if less than all portion indicators $304_1$ . . . $304_n$ are indicated as invalid, i.e., mixed invalid and valid, because the valid bit 206 for the cache line still indicates the cache line is valid.

With the embodiment of FIG. 8, a cache line having all portions invalidated, such as through an RWI command 600 or other process, that also has modified/dirty data, is removed from cache, such as when selected to cache data for another address according to an associative caching algorithm, without copying to the non-volatile memory 116. The modified data for the cache line does not need to be copied and preserved in the non-volatile memory 116 because all portions of the cache line have been invalidated by the process that stored the data in the cache memory 114 for local use during processing operations. Discarding modified data without copying to the non-volatile memory 116, which will not be needed by future processes, minimizes writing and reading operations to the non-volatile memory 116 to avoid wear and extend the life of the non-volatile memory 116, which is particularly important for non-volatile memory devices that experience usage wear leveling.

Figure 9:
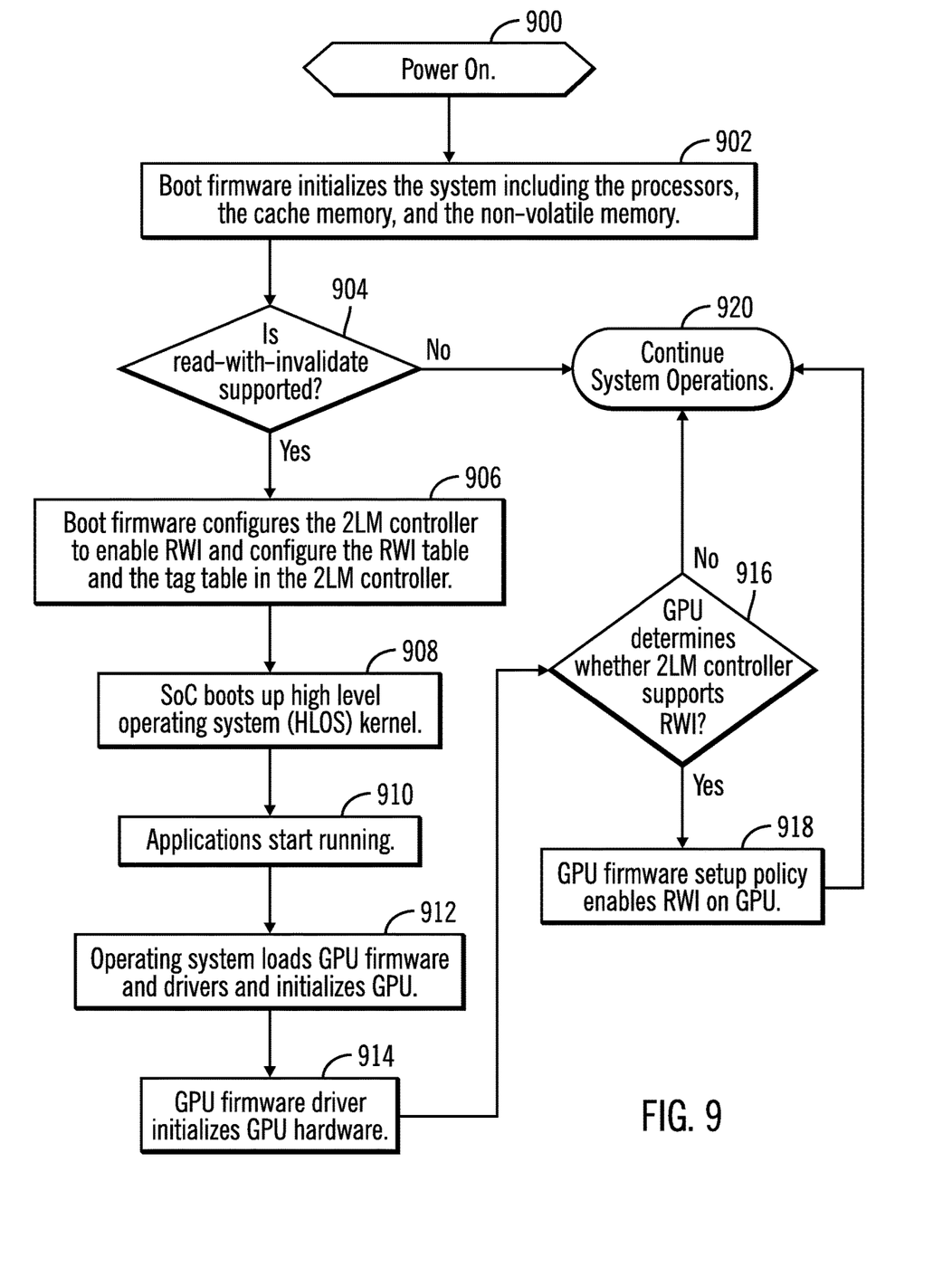
FIG. 9 illustrates an embodiment of a boot routine to enable RWI commands in a system.

With the embodiment of FIG. 8, the memory controller 110 takes the cache line in the first memory that has been fully or partially invalidate to have a lower priority to prefer selection to evict after those cache lines that have similar condition but do not have any portions invalidated FIG. 9 illustrates an embodiment of operations performed by the boot firmware 124 and other initialization firmware in the components 104, 106, 108 to perform initialization operations during power-on. Upon (at block 900) a power-on operation, the boot firmware 124 initializes (at block 902) the SoC 102 including the processors 104, 106, 108, the cache memory 114, and the non-volatile memory 116. If (at block 904) read-with-invalidate is supported, then the boot firmware 124 configures (at block 906) the 2LM controller 110 to enable RWI and configures the RWI table 300 and the tag table 200 in the 2LM controller 110. In the alternative embodiment of FIG. 5, the boot firmware 124 may configure the tag table to have entries 500, with fields for the portion indicators $506_1$, $506_2$ . . . $506_n$. The SoC 102 may then boot-up (at block 908) with a high level operating system (HLOS) kernel executed by the CPU 104 and applications may start (at block 910) running. The operating system executed by the CPU 104 may then load (at block 912) GPU 106 firmware and drivers 121 to initialize the GPU 106. The GPU 106 firmware driver 121 initializes the GPU 106 hardware. If (at block 916) the GPU 106 firmware determines that the 2LM controller 110 supports RWI, then the GPU 106 firmware setup policy enables (at block 918) RWI on the GPU 106, which would allow processes running on the GPU 106 to issue an RWI command 600 when performing a last read of a cache line used only locally in processes and calculations at the GPU 106. If (at block 904) RWI is not supported (at block 904 or 906) or after enabling RWI (at block 918), system operations of the SoC 102 continue (at block 920).

In the described embodiments, the GPU 106 and its associated driver 121 and firmware, etc., are used by way of example, and the same mechanism applies to other system agents, such as CPU, digital signal processor, and others, that may utilize this method to enable the RWI command.

With the embodiment of FIG. 9, the SoC 102 may be initialized to allow for RWI operations upon determining the 2LM controller 110 supports RWI commands 600 by initializing position indicators, e.g., $304_1$, $304_2 \ldots 304_n$ or $506_1$, $506_2 \ldots 506_n$ for use by the 2LM controller.

Figure 10:
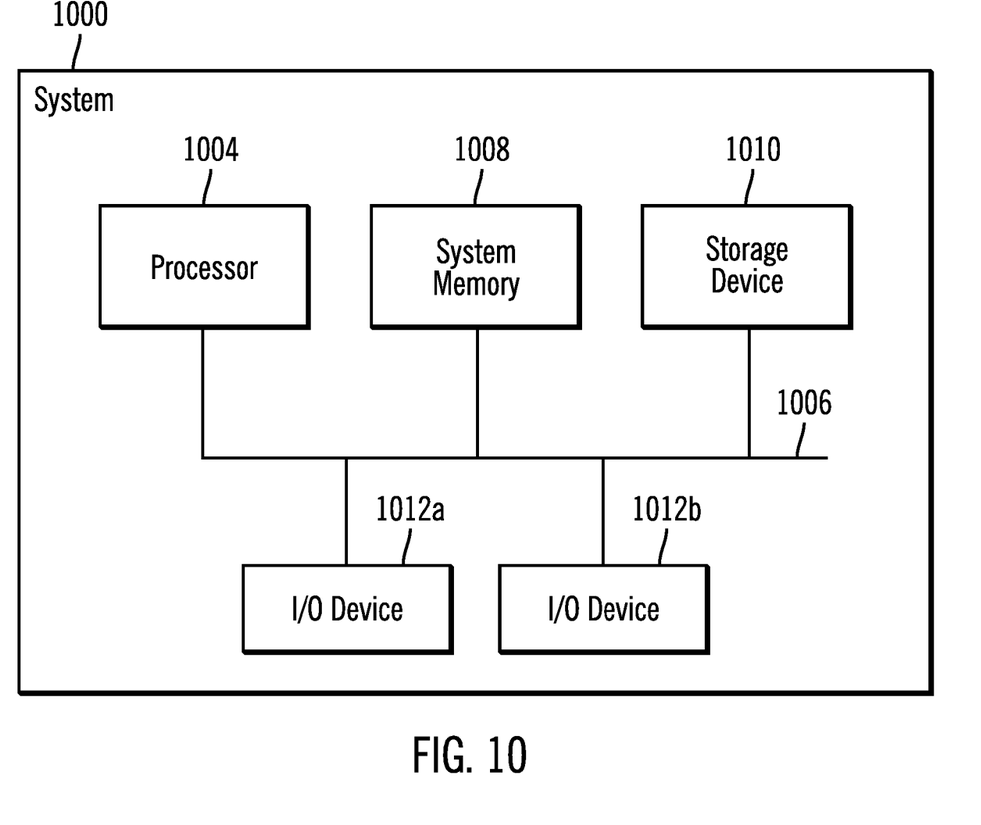
FIG. 10 illustrates a system in which the components of FIG. 1 may be deployed.

FIG. 10 illustrates an embodiment of a system 1000 in which the system 100 of FIG. 1 may be deployed, where the processor 1004 comprises the SoC 102 and the system memory 1008, such as a main memory, comprises the cache memory 114 and non-volatile memory 116. The system 1000 may further include a mass storage device 1010 for long-term storage. The processor 1004 sockets may also communicate with Input/Output (I/O) devices 1012*a*, 1012*b*, which may comprise input devices, display devices, graphics cards, ports, network interfaces, etc.

The described operations of the processing components of FIG. 1 may be implemented as a method, apparatus, device, and a computer program product comprising a computer readable storage medium implemented using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, materials, materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. A computer readable storage medium, as that term is used herein, is not comprised solely of transmission signals and includes physical and tangible components. Those skilled in the art will recognize that many modifications may be made to this configuration without departing from the scope of the present invention, and that the article of manufacture may comprise suitable information bearing medium known in the art.

It should be appreciated that reference throughout this specification to "one structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

Example 1 is an apparatus coupled to a first memory and a second memory comprising a memory controller to cache data in the first memory that is stored in the second memory. The memory controller receives at least one read-with-invalidate command to read and invalidate at least one portion of a cache line having modified data and invalidates the cache line in response to receipt of at least one read-with-invalidate command for at least one portion of the cache line.

In Example 2, the subject matter of Examples 1 and 3-11 can optionally include that the cache line is invalidated in response to receipt of read-with-invalidate commands for all portions of the cache line and not invalidated in response to receipt of read-with-invalidate commands for less than all of the portions of the cache line.

In Example 3, the subject matter of Examples 1, 2 and 4-11 can optionally include that the memory controller is further to allocate a cache line in response to a new data request. Pre-existing data in the allocated cache line that was invalidated is not copied to the second memory and cache lines having portions partially invalidated have a lower eviction priority and are allocated for new data after cache lines that have modified data and do not have any portion invalidated.

In Example 4, the subject matter of Examples 1-3 and 5-11 can optionally include that the memory controller is further to determining that there is no cache line in the first memory for a target address of a read-with-invalidate command and access data from the second memory to return to the read-with-invalidate command. The accessed data is not stored in an allocated cache line in the first memory.

In Example 5, the subject matter of Examples 1-4 and 6-11 can optionally include that the memory controller is further to select the cache line to allocate for data for a target address to add to the first memory. The cache line is not copied to the second memory in response to having received read-with-invalidate commands to read and invalidate all portions of the cache line. The selected cache line is copied to the second memory in response to determining that read-with-invalidate commands were not received for all of the portions of the cache line.

In Example 6, the subject matter of Examples 1-5 and 7-11 can optionally include that the cache line comprises a first cache line. The memory controller is further to select the first cache line to allocate for new data to add to the first memory. The first cache line is replaced without copying to the second memory in response to receipt of read-with-invalidate commands to read and invalidate all portions of the cache line. A second cache line is selected to allocate for new data to add to the first memory in response to determining that read-with-invalidate commands were received for less than all portions of the first cache line.

In Example 7, the subject matter of Examples 1-6 and 8-11 can optionally include that the memory controller is further to maintain portion indicators, one for each portion of the portions of the cache line. A portion indicator is set to indicate invalid data in response to receiving a read-with-invalidate command to a portion of the cache line represented by the portion indicator. The cache line is replaced without copying to the second memory in response to at least one portion indicator for the cache line indicating the at least one portion of the cache line has invalid data.

In Example 8, the subject matter of Examples 1-7 and 9-11 can optionally include that the memory controller is further to maintain a read-with-invalidate table including an entry for each of a plurality of cache lines in the first memory. Each entry in the read-with-invalidate table includes the portion indicators for portions of data in the cache line.

In Example 9, the subject matter of Examples 1-8 and 10-11 can optionally include that the memory controller is further to maintain a tag table including an entry for each cache line in the first memory indicating an address of the data in the cache line in the first memory, a valid flag indicating whether the cache line has valid data and a dirty flag indicating whether the cache line has modified data. The valid flag and the dirty flag in an entry in tag table for the cache line are set to indicate invalid data and unmodified data, respectively, in response to all the portion indicators in an entry in the read-with-invalidate table for the cache line indicating invalid data.

In Example 10, the subject matter of Examples 1-9 and 11 can optionally include that the memory controller is further to maintain a tag table including an entry for each cache line in the first memory indicating an address of the data in the cache line in the first memory, a dirty flag indicating whether the cache line has modified data, and the portion indicators for each portion of data of the portions of data of the cache line.

In Example 11, the subject matter of Examples 1-10 can optionally include that the first memory comprises a volatile memory device and the second memory comprises a byte addressable non-volatile memory to cache data stored in the second memory.

Example 12 is a system, comprising at least one processing unit, a memory controller, a first memory coupled to the memory controller, and a second memory coupled to the memory controller, wherein data evicted from the first memory is stored in the second memory. The memory controller manages data in the first memory and the second memory to receive at least one read-with-invalidate command to read and invalidate at least one portion of a cache line having modified data and invalidate the cache line in response to receipt of at least one read-with-invalidate command for at least one portion of the cache line.

In Example 13, the subject matter of Examples 12 and 14-18 can optionally include boot service firmware to initialize the system including the at least one processing unit, the first memory, and the second memory; determine whether read-with-invalidate commands are supported; and configure memory controller to enable processing of read-with-invalidate commands to invalidate portions of a cache line in the first memory. Processor firmware is to initialize the at least one processing unit; determine whether read-with-invalidate commands are supported; and configure the at least one processing unit to enable use of read-with-invalidate commands to invalidate portions of a cache line in the first memory that are accessed a last time.

In Example 14, the subject matter of Examples 12, 13 and 15-18 can optionally include that the cache line is invalidated in response to receipt of read-with-invalidate commands for all the portions of the cache line and not invalidated in response to receipt of read-with-invalidate commands for less than all of the portions of the cache line.

In Example 15, the subject matter of Examples 12-14 and 16-18 can optionally include that the memory controller is further to determine that there is no cache line in the first memory for a target address of a read-with-invalidate command and access data from the second memory to return to the read-with-invalidate command, wherein the accessed data is not stored in an allocated cache line in the first memory.

In Example 16, the subject matter of Examples 12-15 and 17-18 can optionally include that the cache line comprises a first cache line. The memory controller is further to select the first cache line to allocate for new data to add to the first memory, wherein the first cache line is replaced without copying to the second memory in response to receipt of read-with-invalidate commands to read and invalidate all portions of the cache line and select a second cache line to allocate for new data to add to the first memory in response to determining that read-with-invalidate commands were received for less than all portions of the first cache line.

In Example 17, the subject matter of Examples 12-16 and 18 can optionally include that the memory controller is further to maintain portion indicators, one for each portion of the portions of the cache line. A portion indicator is set to indicate invalid data in response to receiving a read-with-invalidate command to a portion of the cache line represented by the portion indicator. The cache line is replaced without copying to the second memory in response to at least one portion indicator for the cache line indicating the at least one portion of the cache line has invalid data.

In Example 18, the subject matter of Examples 12-17 can optionally include that the memory controller is further to maintain a read-with-invalidate table including an entry for each of a plurality of cache lines in the first memory. Each entry in the read-with-invalidate table includes the portion indicators for portions of data in the cache line.

Example 19 is a method for caching data in a first memory that is stored in a second memory. At least one read-with-invalidate command is received to read and invalidate at least one portion of a cache line having modified data. The cache line is invalidated in response to receipt of at least one read-with-invalidate command for at least one portion of the cache line.

In Example 20, the subject matter of Examples 19 and 21-23 can optionally include allocating a cache line to a new data request in response to portions being partially invalidated. The data in the allocated cache line includes modified data is not copied to the second memory. Cache lines having portions partially invalidated have a lower eviction priority and are allocated for new data after cache lines that have modified data and do not have any portion invalidated.

In Example 21, the subject matter of Examples 19, 20 and 22-23 can optionally include determining that there is no cache line in the first memory for a target address of a read-with-invalidate command and accessing data from the second memory to return to the read-with-invalidate command, wherein the accessed data is not stored in an allocated cache line in the first memory.

In Example 22, the subject matter of Examples 19-21 and 23 can optionally include maintaining portion indicators, one for each portion of the portions of the cache line and setting a portion indicator to indicate invalid data in response to receiving a read-with-invalidate command to a portion of the cache line represented by the portion indicator. The cache line is replaced evicted without copying to the second memory in response to at least one portion indicator for the cache line indicating the at least one portion of the cache line has invalid data.

In Example 23, the subject matter of Examples 19-22 can optionally include maintaining a read-with-invalidate table including an entry for each of a plurality of cache lines in the first memory. Each entry in the read-with-invalidate table includes the portion indicators for portions of data in the cache line.

Example 24 is a computer program product comprising a computer readable storage medium having computer program code executed by a processor to interface with a memory controller maintaining a first memory and a second memory, wherein modified data evicted from the first memory is stored in the second memory. The computer program code is executed by a processor to perform operations, the operations comprising: storing modified data at an address in a cache line in the first memory, wherein the modified data is used locally by the processor and upon a last access of a portion of modified data in the cache line, send a read-with-invalidate command to read and invalidate a portion of the cache line having modified data subject to the last access to cause the memory controller to indicate the portion of the cache line as invalid and to cause the memory controller to invalidate the cache line in response to receipt of at least one read-with-invalidate command for at least one portion of the cache line.

In Example 25, the subject matter of Example 24 can optionally include sending read-with-invalidate commands for all portions of the cache line upon lasts accesses of the portions of the cache line to read and invalidate all the portions of the cache line to cause the memory controller to indicate all the portions of the cache line as invalid and to cause the memory controller to replace a cache line for the address having modified data without copying to the second memory when all the portions of the cache line are indicated as invalid in response to receiving the read-with-invalidate commands for all the portions.

Example 26 is an apparatus for caching data in a first memory that is stored in a second memory and comprises means for receiving at least one read-with-invalidate command to read and invalidate at least one portion of a cache line having modified data and means for invalidating the cache line in response to receipt of at least one read-with-invalidate command for at least one portion of the cache line.

Example 27 is a machine-readable storage including machine-readable instructions, when executed, to implement a method or realize an apparatus as claimed in any preceding example.

Example 28 is an apparatus comprising means to perform a method as claimed in any preceding example.

What is claimed:

1. An apparatus coupled to a first memory and a second memory, comprising:
   a memory controller to cache data in the first memory that is stored in the second memory and to:
     receive at least one read-with-invalidate command to read and invalidate one portion of a plurality of portions of a cache line having modified data;
     indicate as invalid a portion indicator in an entry for the cache line in a table for the portion indicated in the read-with-invalidate command as invalid, wherein the table includes an entry for each of cache lines in the first memory, wherein each entry in the table includes portion indicators for portions of data in the cache line; and
     invalidate the cache line in response to receipt of at least one read-with-invalidate command for at least one portion of the cache line.

2. The apparatus of claim 1, wherein the cache line is invalidated in response to receipt of read-with-invalidate commands for all portions of the cache line and not invalidated in response to receipt of read-with-invalidate commands for less than all of the portions of the cache line.

3. The apparatus of claim 1, wherein the memory controller is further to:
   allocate a cache line in response to a new data request, wherein pre-existing data in the allocated cache line that was invalidated is not copied to the second memory, and wherein cache lines having portions partially invalidated have a lower eviction priority and are allocated for new data after cache lines that have modified data and do not have any portion invalidated.

4. The apparatus of claim 1, wherein the memory controller is further to:
   determine that there is no cache line in the first memory for a target address of a read-with-invalidate command; and
   access data from the second memory to return to the read-with-invalidate command, wherein the accessed data is not stored in an allocated cache line in the first memory.

5. The apparatus of claim 1, wherein the memory controller is further to:
   select the cache line to allocate for data for a target address to add to the first memory, wherein the cache line is not copied to the second memory in response to having received read-with-invalidate commands to read and invalidate all portions of the cache line; and
   copy the selected cache line to the second memory in response to determining that read-with-invalidate commands were not received for all of the portions of the cache line.

6. The apparatus of claim 1, wherein the cache line comprises a first cache line, wherein the memory controller is further to:
   select the first cache line to allocate for new data to add to the first memory, wherein the first cache line is replaced without copying to the second memory in response to receipt of read-with-invalidate commands to read and invalidate all portions of the cache line; and
   select a second cache line to allocate for new data to add to the first memory in response to determining that read-with-invalidate commands were received for less than all portions of the first cache line.

7. The apparatus of claim 1, wherein there is one portion indicator for each portion of the portions of the cache line, wherein the cache line is replaced without copying to the second memory in response to at least one portion indicator for the cache line indicating the at least one portion of the cache line has invalid data.

8. The apparatus of claim 7, wherein the memory controller is further to:
   maintain a tag table including an entry for each cache line in the first memory indicating an address of the data in the cache line in the first memory, a valid flag indicating whether the cache line has valid data and a dirty flag indicating whether the cache line has modified data; and set the valid flag and the dirty flag in an entry in tag table for the cache line to indicate invalid data and unmodified data, respectively, in response to all the portion indicators in an entry in the table for the cache line indicating invalid data.

9. The apparatus of claim 7, wherein the memory controller is further to:
maintain a tag table including an entry for each cache line in the first memory indicating an address of the data in the cache line in the first memory, a dirty flag indicating whether the cache line has modified data, and the portion indicators for each portion of data of the portions of data of the cache line.

10. The apparatus of claim 1, wherein the first memory comprises a volatile memory device and the second memory comprises a byte addressable non-volatile memory to cache data stored in the second memory.

11. A system, comprising:
at least one processing unit;
a memory controller;
a first memory coupled to the memory controller; and
a second memory coupled to the memory controller, wherein data evicted from the first memory is stored in the second memory;
wherein the memory controller manages data in the first memory and the second memory to:
receive at least one read-with-invalidate command to read and invalidate one portion of a plurality of portions of a cache line having modified data;
indicate as invalid a portion indicator in an entry for the cache line in a table for the portion indicated in the read-with-invalidate command as invalid, wherein the table includes an entry for each of cache lines in the first memory, wherein each entry in the table includes portion indicators for portions of data in the cache line; and
invalidate the cache line in response to receipt of at least one read-with-invalidate command for at least one portion of the cache line.

12. The system of claim 11, further comprising:
boot service firmware to:
initialize the system including the at least one processing unit, the first memory, and the second memory;
determine whether read-with-invalidate commands are supported; and
configure memory controller to enable processing of read-with-invalidate commands to invalidate portions of a cache line in the first memory; and
processor firmware to:
initialize the at least one processing unit;
determine whether read-with-invalidate commands are supported; and
configure the at least one processing unit to enable use of read-with-invalidate commands to invalidate portions of a cache line in the first memory that are accessed a last time.

13. The system of claim 11, wherein the cache line is invalidated in response to receipt of read-with-invalidate commands for all the portions of the cache line and not invalidated in response to receipt of read-with-invalidate commands for less than all of the portions of the cache line.

14. The system of claim 11, wherein the memory controller is further to:
determine that there is no cache line in the first memory for a target address of a read-with-invalidate command; and
access data from the second memory to return to the read-with-invalidate command, wherein the accessed data is not stored in an allocated cache line in the first memory.

15. The system of claim 11, wherein the cache line comprises a first cache line, wherein the memory controller is further to:
select the first cache line to allocate for new data to add to the first memory, wherein the first cache line is replaced without copying to the second memory in response to receipt of read-with-invalidate commands to read and invalidate all portions of the cache line; and
select a second cache line to allocate for new data to add to the first memory in response to determining that read-with-invalidate commands were received for less than all portions of the first cache line.

16. The system of claim 11, wherein there is one portion indicator for each portion of the portions of the cache line, wherein the cache line is replaced without copying to the second memory in response to at least one portion indicator for the cache line indicating the at least one portion of the cache line has invalid data.

17. A method for caching data in a first memory that is stored in a second memory, comprising:
receiving at least one read-with-invalidate command to read and invalidate one portion of a plurality of portions of a cache line having modified data;
indicate as invalid a portion indicator in an entry for the cache line in a table for the portion indicated in the read-with-invalidate command as invalid, wherein the table includes an entry for each of cache lines in the first memory, wherein each entry in the table includes portion indicators for portions of data in the cache line; and
invalidating the cache line in response to receipt of at least one read-with-invalidate command for at least one portion of the cache line.

18. The method of claim 17, further comprising:
allocating a cache line to a new data request in response to portions being partially invalidated, wherein the data in the allocated cache line including modified data is not copied to the second memory, and wherein cache lines having portions partially invalidated have a lower eviction priority and are allocated for new data after cache lines that have modified data and do not have any portion invalidated.

19. The method of claim 18, further comprising:
determining that there is no cache line in the first memory for a target address of a read-with-invalidate command; and
accessing data from the second memory to return to the read-with-invalidate command, wherein the accessed data is not stored in an allocated cache line in the first memory.

20. The method of claim 17, wherein there is one portion indicator for each portion of the portions of the cache line, wherein the cache line is replaced without copying to the second memory in response to at least one portion indicator for the cache line indicating the at least one portion of the cache line has invalid data.

21. A computer program product comprising a computer readable storage medium having computer program code executed by a processor to interface with a memory controller maintaining a first memory and a second memory, wherein modified data evicted from the first memory is stored in the second memory, wherein the computer program code is executed by a processor to perform operations, the operations comprising:

storing modified data at an address in a cache line in the first memory, wherein the modified data is used locally by the processor; and     upon a last access of a portion of modified data in the cache line, send a read-with-invalidate command to read and invalidate one portion of a plurality of portions of the cache line having modified data subject to the last access to cause the memory controller to indicate as invalid a portion indicator in an entry for the cache line in a table for the portion indicated in the read-with-invalidate command as invalid, wherein the table includes an entry for each of cache lines in the first memory, wherein each entry in the table includes portion indicators for portions of data in the cache line and to cause the memory controller to invalidate the cache line in response to receipt of at least one read-with-invalidate command for at least one portion of the cache line.

22. The computer program product of claim 21, wherein the operations further comprise:

sending read-with-invalidate commands for all portions of the cache line upon lasts accesses of the portions of the cache line to read and invalidate all the portions of the cache line to cause the memory controller to indicate all the portions of the cache line as invalid and to cause the memory controller to replace a cache line for the address having modified data without copying to the second memory when all the portions of the cache line are indicated as invalid in response to receiving the read-with-invalidate commands for all the portions.

\* \* \* \* \*